US008762783B2

(12) United States Patent
Abrams et al.

(10) Patent No.: US 8,762,783 B2
(45) Date of Patent: Jun. 24, 2014

(54) ERROR IDENTIFICATION

(75) Inventors: Robert M. Abrams, Wappingers Falls, NY (US); Barbara J. Bryant, Clinton Corners, NY (US); Donald T. Durand, Saugerties, NY (US); Ming-Yin Ng, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 12/822,738

(22) Filed: Jun. 24, 2010

(65) Prior Publication Data
US 2011/0320873 A1 Dec. 29, 2011

(51) Int. Cl.
*G06F 11/00* (2006.01)

(52) U.S. Cl.
USPC ............ 714/37; 714/39; 709/223; 711/154; 711/156

(58) Field of Classification Search
USPC ............ 714/37, 39; 709/223; 711/154, 156
See application file for complete search history.

(56) References Cited

U.S. PATENT DOCUMENTS

| | | | | |
|---|---|---|---|---|
| 5,168,554 A * | 12/1992 | Luke | | 715/209 |
| 5,274,811 A * | 12/1993 | Borg et al. | | 717/128 |
| 5,278,976 A | 1/1994 | Wu | | |
| 5,668,988 A * | 9/1997 | Chen et al. | | 1/1 |
| 5,909,573 A * | 6/1999 | Sheaffer | | 712/240 |
| 6,021,261 A * | 2/2000 | Barrett et al. | | 714/37 |
| 6,125,322 A * | 9/2000 | Bischof et al. | | 701/114 |
| 6,263,428 B1 * | 7/2001 | Nonomura et al. | | 712/239 |
| 6,269,478 B1 | 7/2001 | Lautenbach-Lampe et al. | | |
| 6,539,500 B1 * | 3/2003 | Kahle et al. | | 714/45 |
| 6,598,179 B1 * | 7/2003 | Chirashnya et al. | | 714/37 |
| 6,647,517 B1 * | 11/2003 | Dickey et al. | | 714/48 |
| 6,650,949 B1 * | 11/2003 | Fera et al. | | 700/79 |
| 6,684,348 B1 * | 1/2004 | Edwards et al. | | 714/45 |
| 6,691,207 B2 * | 2/2004 | Litt et al. | | 711/108 |
| 6,738,929 B2 * | 5/2004 | Swoboda et al. | | 714/28 |
| 6,988,190 B1 * | 1/2006 | Park | | 712/241 |
| 7,159,101 B1 * | 1/2007 | Thekkath et al. | | 712/227 |
| 7,165,190 B1 * | 1/2007 | Srivastava et al. | | 714/38.14 |
| 7,225,368 B2 * | 5/2007 | Lancaster | | 714/48 |
| 7,359,834 B2 | 4/2008 | Vaidyanathan et al. | | |
| 7,395,457 B2 * | 7/2008 | Jiang et al. | | 714/45 |
| 7,437,619 B2 * | 10/2008 | McCullough et al. | | 714/45 |
| 7,441,154 B2 * | 10/2008 | Klotz et al. | | 714/39 |
| 7,530,072 B1 | 5/2009 | Cheaz | | |
| 7,620,855 B2 * | 11/2009 | DeCenzo et al. | | 714/48 |

(Continued)

FOREIGN PATENT DOCUMENTS

JP 63-298539 12/1988

OTHER PUBLICATIONS

Burnim, Jacob, et al., "Looper: Lightweight Detection of Infinite Loops at Runtime", Electrical Engineering and Computer Sciences Department, University of California, Berkeley, Berkeley, CA, USA, pp. 1-9.

*Primary Examiner* — Loan L. T. Truong
(74) *Attorney, Agent, or Firm* — Cantor Colburn LLP; William A. Kinnaman, Jr.

(57) ABSTRACT

A method of identifying errors in a computing system operation is provided and includes identifying that a certain record of interest in system trace information has a number of entries that exceeds a predefined number and inferring from the excessive number of entries that a work unit associated with the certain record of interest is affected by an error.

18 Claims, 3 Drawing Sheets

(56) References Cited

U.S. PATENT DOCUMENTS

| | | | |
|---|---|---|---|
| 7,633,952 B2* | 12/2009 | Ong et al. | 370/400 |
| 7,802,145 B1* | 9/2010 | Bainbridge et al. | 714/38.1 |
| 7,849,364 B2* | 12/2010 | Callender | 714/38.1 |
| 8,015,391 B2* | 9/2011 | Tani | 712/24 |
| 8,140,903 B2* | 3/2012 | Goodman et al. | 714/30 |
| 2003/0074607 A1* | 4/2003 | Brundridge et al. | 714/48 |
| 2003/0115508 A1* | 6/2003 | Ali et al. | 714/43 |
| 2004/0073843 A1* | 4/2004 | Dean et al. | 714/37 |
| 2005/0278705 A1* | 12/2005 | Castellanos et al. | 717/128 |
| 2005/0289404 A1* | 12/2005 | Maguire | 714/57 |
| 2006/0013142 A1* | 1/2006 | Hongal et al. | 370/248 |
| 2006/0101416 A1* | 5/2006 | Callahan et al. | 717/128 |
| 2006/0126515 A1* | 6/2006 | Ward et al. | 370/241 |
| 2006/0184834 A1* | 8/2006 | Al-Omari et al. | 714/45 |
| 2007/0225943 A1* | 9/2007 | Marano | 702/186 |
| 2008/0016408 A1* | 1/2008 | Abernathy et al. | 714/45 |
| 2008/0016500 A1* | 1/2008 | Hinkley et al. | 717/128 |
| 2008/0092123 A1* | 4/2008 | Davison et al. | 717/128 |
| 2008/0127212 A1* | 5/2008 | Nakamizo et al. | 719/315 |
| 2009/0044059 A1* | 2/2009 | Sakiyama et al. | 714/45 |
| 2009/0063578 A1* | 3/2009 | D'Angelo et al. | 707/202 |
| 2009/0119466 A1* | 5/2009 | Gower et al. | 711/154 |
| 2009/0125756 A1* | 5/2009 | Swaine et al. | 714/45 |
| 2009/0217018 A1* | 8/2009 | Abrashkevich et al. | 712/244 |
| 2009/0292760 A1* | 11/2009 | Leedberg et al. | 709/202 |
| 2010/0100774 A1* | 4/2010 | Ding et al. | 714/45 |
| 2010/0268995 A1* | 10/2010 | Goodman et al. | 714/45 |
| 2010/0293422 A1* | 11/2010 | Huang et al. | 714/726 |

* cited by examiner

FIG. 3

| Job | Task | COUNT |
|---|---|---|
| Job 1 | TASK 1 | 1 |
| | TASK 1 | 2 |
| | TASK 1 | 3 |
| | TASK 2 | 1 |
| | TASK 2 | 2 |
| | TASK 2 | 3 |
| | . . . | . . . |
| | TASK 2 | 1000 |
| | TASK 2 | 1001 |
| Job 2 | TASK 1 | 1 |
| | TASK 1 | 2 |
| | TASK 1 | 3 |
| | TASK 2 | 1 |
| | TASK 2 | 2 |
| | TASK 2 | 3 |

300 — 310 — 301 Job, 302 Task, 303 COUNT

ERROR IDENTIFICATION

BACKGROUND

This invention relates generally to processing within a computing environment, and more particularly to programmatic identification of errors, such as loops.

A major cause of system outages in certain types of computing systems is authorized programs getting into a processing loop as a result of a software defect manifested externally as hung jobs or system outages. Unfortunately, the types of software defects in question are difficult to identify and correct. By way of review, the following approaches exist today.

In one approach, the instruction counter (for example, program status word (PSW)) is sampled in system control blocks related to an executing unit of work over a specified time interval to suggest that a task may be looping based on high CPU and little or no I/O activity. Activity that is consuming CPU resources or waiting for CPU resources are considered suspicious symptoms and are identified by the product as such. With this approach, it is not truly known whether the program in question is looping or simply taking a long time to execute.

Explicit evidence of a looping unit of work may be identified by analysis of events in a system trace, which may also be referred to as a flight recorder trace, examined in, for example, a storage dump. This analysis is manual in nature, however, and can only be done by initiating a storage dump and then analyzing it minutes or hours later.

There are also a number of existing patents that discuss the creation and usage of memory traces to identify patterns based on similar addresses in different ranges using a variety of techniques (for, e.g., network and java profiling). For example, U.S. Pat. No. 6,347,383 discloses address space compression through loop detection and reduction where loops are detected by determining control flow based on a memory address trace, looking for address references and reducing the trace content based on those address references. U.S. Pat. No. 6,691,207 teaches implementing loop compression in a program counter. Here, an on-chip (i.e., hardware) logic analyzer receives program counter (address reference) data used to determine when software loops exist. U.S. Pat. No. 5,355,487 teaches a non-invasive trace-driven system and method for computer system profiling including creation of a "trace hook" in a periodic clock routine of an operating system kernel to drive specific trace events related to process state changes, analogous to creating new trace entries in an existing trace. U.S. Pat. No. 5,805,863 discloses a memory pattern analysis tool for use in optimizing computer program code and, again, defines its loop analysis based on trace records with at least one memory address reference. U.S. Pat. No. 5,274,811 discloses a method for quickly acquiring and using very long traces of mixed system and user memory references. The algorithm defined in this patent is based on memory access patterns.

BRIEF SUMMARY

In accordance with an aspect of the invention, a method of identifying errors in a computing system operation is provided and includes identifying that a certain record of interest in system trace information has a number of entries that exceeds a predefined number and inferring from the excessive number of entries that a work unit associated with the certain record of interest is affected by an error.

In accordance with another aspect of the invention, a method of identifying execution loops in a computing system is provided and includes obtaining system trace information, sorting and organizing the system trace information, identifying that a certain type of record in the system trace information has a first predefined number of entries, removing noise entries and discarding certain other entries and, in an event a number of remaining entries is greater than a second predefined number, inferring that a work unit associated with the certain type of record is in a loop.

In accordance with yet another aspect of the invention, a non-transitory computer readable medium is provided and has executable instructions stored thereon, which, when executed cause a processing unit of a computing system to perform a method of identifying errors in an operation of the computing system, the method including identifying that a certain record of interest in system trace information has a number of entries that exceeds a predefined number and inferring from the excessive number of entries that a work unit associated with the certain record of interest is affected by an error.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES in which:

FIG. 3 is an exemplary information table resulting from analyzing the system trace.

DETAILED DESCRIPTION

In accordance with aspects of the invention, a system trace for a given computing system or device is a built-in flight recorder trace program or a record of system events with information including, but not limited to, kernel events, input/output (I/O) interrupts and supervisor-assisted program transfer instructions. It also contains information useful in diagnosing a wide variety of problems associated with programs being currently executed and contains information that reliably identifies such problems, such as enabled loops that represent looping programs that are enabled for interrupts, which includes most system code today, with the exception of restricted environments that are disabled for program interruptions.

In some embodiments, trace entries may be written for many supervisor-assisted instructions. An internal service referred to as a snaptrace (SNAPTRC) may be used to obtain a copy of trace entries where the output is mapped as a trace table copy header (TTCH). The system trace may be made available in storage dumps and may be formatted by a system trace (SYSTRACE) command.

Figure 1:
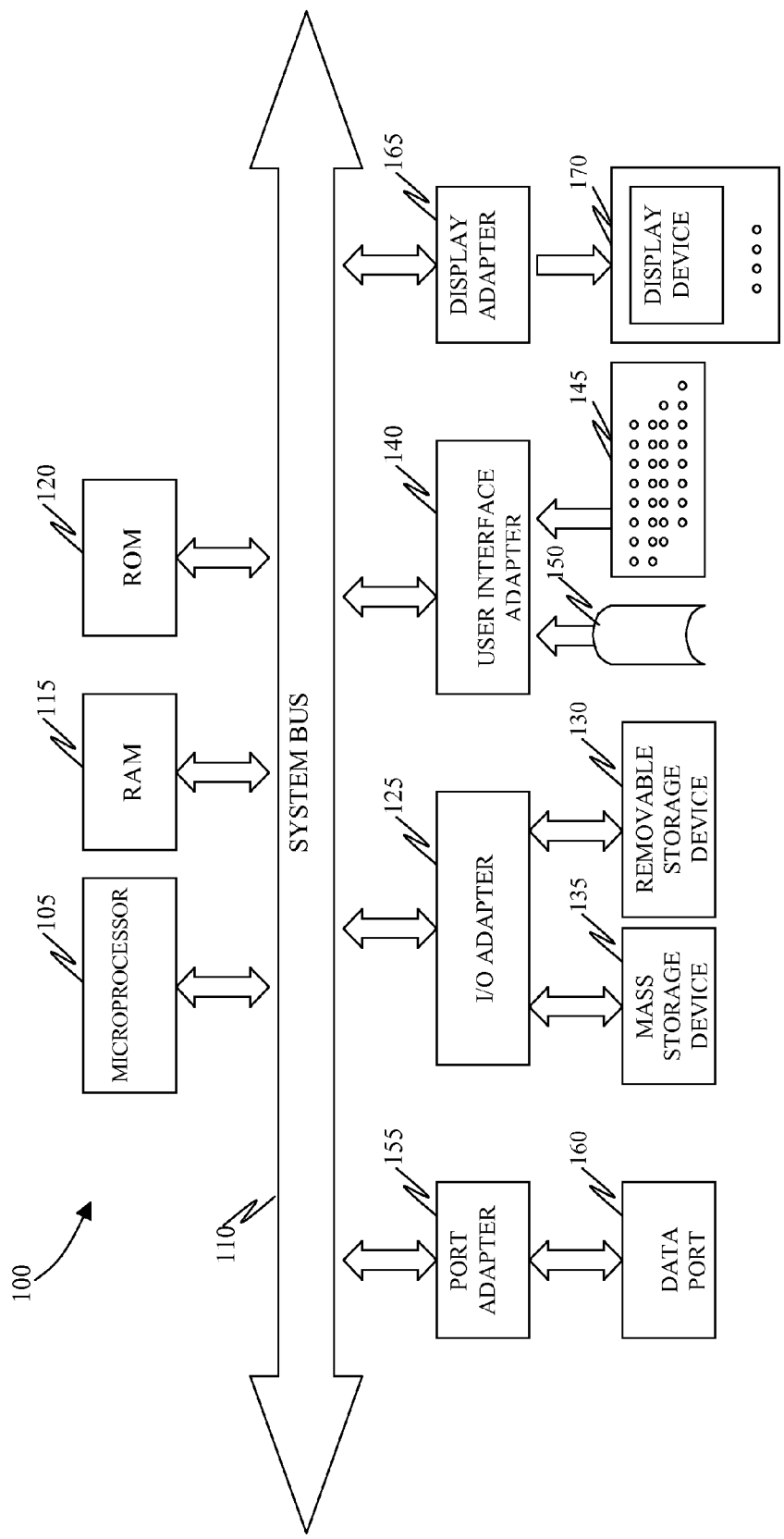
FIG. 1 depicts an exemplary computer device.

With reference to FIG. 1, an exemplary computing device 100 is provided. The computing device 100 includes a central processing unit (CPU), such as a microprocessor 105, and memory or storage units, such as random access memory (RAM) 115 and read-only memory (ROM) 120). The CPU and the memory or storage units are coupled to and disposed in signal communication with one another via a system bus 110. Also coupled to and disposed in signal communication with the system bus 110 may be an I/O adapter 125, a user interface adapter 140, a port adapter 155 and a display adapter 165. The I/O adapter 125 may be coupled to a removable storage device 130 and a mass storage device 135. The user interface adapter 140 may receive input from a keyboard 145 and/or a mouse 150. The port adapter 155 may be coupled to a data port 160 and the display adapter 165 may be coupled to a display device 170.

The memory or stage units may include a non-transitory computer readable medium having executable instructions stored thereon. When executed, these executable instructions may be configured to cause the CPU to operate in the manner described below and with reference to FIGS. 2 and 3.

Figure 2:
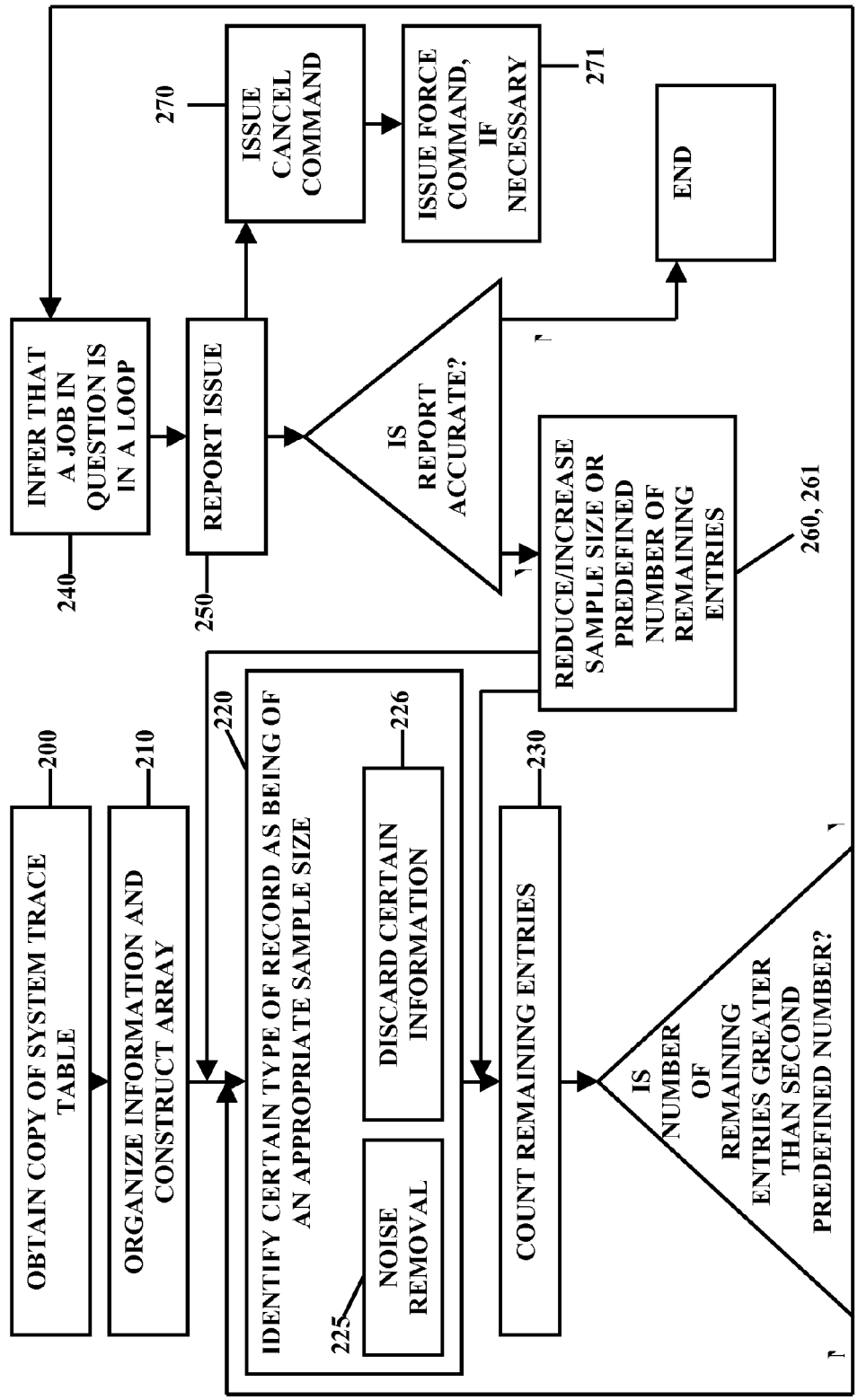
FIG. 2 illustrate a method of operating an exemplary computing device in accordance with embodiments of the invention.

That is, with reference to FIGS. 2 and 3 and, in accordance with aspects of the invention, enabled errors, such as loops, are detected based on an analysis of system trace records that are currently captured on a continuous basis (i.e., in real time) by the system trace program or flight recorder program currently being executed. Trace activity is then analyzed for substantially all work units as are available and as captured in the system trace table by an inspection of execution loops, repetitive or recursive errors and other similar types of patterns.

As shown in FIGS. 2 and 3 and, in accordance with embodiments of the invention, a copy of a system trace table 300 (see FIG. 3) is obtained (200) for each processor whose operations are being analyzed (i.e., each CPU being analyzed). Information contained within the system trace table is then organized in layers of hierarchical data (210). For example, the information may be organized by job 301 and task 302 to thereby construct an array 310 with counts 303 for different trace record types.

Once the array 310 is constructed, certain types of records with a first predefined number or percentage of time slice trace entries are identified (220) as being of potential concern. Here, the first predefined number or percentage is, for example, 1000 and representative of an appropriate sample size of time slice entries and is, at least initially, set to a high enough number or percentage so that only those types of records having a statistically significant number or percentage of time slice entries are studied. That is, only those jobs or programs at risk of being affected by an error, such as being in a loop, are analyzed.

At this point, time slice trace entries associated with noise are removed (225) from consideration. Also, certain unwanted types of trace entries, such as trace entries that are representative of branch and/or other miscellaneous events and well as records relating to special processors are discarded (226) as well. This can be accomplished by, for example, locating time slice trace entries, such as EXT 1005 records of a certain executable function that is followed by about 1000 trace entries after removing noise, where 95% of trace records for a specific work unit are EXT 1005 records. This can also be accomplished by the discarding of time slice trace entries that are representative of records related to branch and other miscellaneous events as well as records related to special processors.

Here, the number or percentage of remaining trace entries, which represent timed interrupts, with the noise removed and the certain types of trace entries discarded are counted (230). In an event that the number or percentage of remaining trace records is greater than a second predefined number or percentage, such as 500 once noise is removed and unwanted trace entries are discarded, it can be inferred that the unit of work, job or program in question, which is associated with the certain type of record, is likely in a loop (240). In accordance with embodiments, an existence of a potential loop is then reported (250) to an operator by, for example, a communiqué, such as an email alert or an instant message. This reporting may provide the operator with an address space name and a description of the current situation and/or the problem of the potential loop.

If the number or percentage of remaining trace entries does not exceed the second predefined number or percentage, control reverts to operation 220, as shown in FIG. 2. Moreover, if, as a result of the operator's further analysis, it is determined that the sample size needs to be decreased or increased, the first predefined number or percentage may be updated. Similarly, if it is determined that the system recognized the loop as a potential loop too slowly, the second predefined number or percentage of remaining trace entries records may be reduced (260) with control then reverting to operation 230. Conversely, if it is determined that the system is overly sensitive and, therefore, producing an excess of false positives, the second predefined number or percentage of remaining trace records may be increased (261) with control then reverting to operation 230.

In an exemplary situation, with reference to FIG. 3, it is seen that for the system trace table 300, job 1 has 3 time slice trace entries for task 1 and 1001 time slice trace entries for task 2. Accordingly, since the predefined number or percentage of time slice trace entries that is representative of an appropriate sample size is set at 1000 or more, task 2 is identified. At this point, it is noted that task 1001 is either noise to be removed or a trace record that is related to a special processor and therefore to be discarded such that task 2 has 1000 remaining trace entries. Since the predefined number or percentage of remaining trace entries is, at least initially, set at 500, it may be inferred that task 2 is in a loop and that a report of a potential problem needs to be generated. Further, since the number or percentage of remaining trace entries for task 2 so greatly exceeded the predefined number or percentage of remaining records, it may be further surmised that the appropriate sample size and the first predefined number or percentage can be safely increased. If however, task 2 is found not be in a loop upon further investigation, it may be surmised that the system trace program or the flight recorder program is overly sensitive and that the appropriate sample size should probably not be changed but that, in fact, the second predefined number or percentage of remaining records should perhaps be increased.

Installation of the system trace program or the flight recorder program, as described above, may assist in recovery of, for example, a business critical operation by terminating or helping to terminate an identified hung job. In particular, with further reference to FIG. 2, the method may further include the issuing of a cancel command (270) to cancel the work unit in question, which may works if the looping task is not holding a local lock. Alternatively, a force cancel command may be issued (271) if the previous cancel command is determined to have failed to result in termination of the job.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all features in the claims below are intended to include any structure, material or act for performing the operation in combination with other claimed features as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable medium(s) having computer readable program code embodied thereon.

Any combination of one or more non-transitory computer readable medium(s) may be utilized. The non-transitory computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, cause execution of the operations/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate architecture, functionality and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of identifying errors in a computing system operation, the method comprising:
   identifying that a certain record of interest in system trace information has a number of entries that exceeds a predefined number; and
   inferring from the excessive number of entries that a work unit associated with the certain record of interest is affected by an error,
   wherein the entries of interest comprise those entries not discarded as relating to special processors.

2. The method according to claim 1, wherein the system trace information is provided in a copy of a system trace table provided for each processor in the computing system.

3. The method according to claim 1, further comprising sorting and organizing the system trace information according to a system hierarchy.

4. The method according to claim 3, wherein the sorting and organizing comprises:
   arranging the system trace information by job, task and count; and
   constructing a system trace information array according to the job, the task and the count.

5. The method according to claim 1, wherein the predefined number is updateable.

6. The method according to claim 1, further comprising reporting the error to an operator.

7. The method according to claim 1, further comprising issuing a cancel command to cancel the work unit.

8. A method of identifying execution loops in a computing system, comprising:
   obtaining system trace information;
   sorting and organizing the system trace information;
   identifying that a certain type of record in the system trace information has a first predefined number of entries;
   removing noise entries and discarding certain other entries; and
   in an event a number of remaining entries is greater than a second predefined number, inferring that a work unit associated with the certain type of record is in a loop.

9. The method according to claim 8, wherein the system trace information is provided in a copy of a system trace table.

10. The method according to claim 9, wherein the system trace table is provided for each processor in the computing system.

11. The method according to claim 8, wherein the sorting and organizing comprises arranging the system trace information according to a system hierarchy.

12. The method according to claim 8, wherein the sorting and organizing comprises arranging the system trace information by job, task and count in an array.

13. The method according to claim 8, wherein the certain other entries are related to special processors and/or being representative of branch and/or other miscellaneous events.

14. The method according to claim 8, wherein the first and second predefined numbers are updateable.

15. The method according to claim 14, further comprising evaluating an accuracy of the inferring and reducing or increasing the first or second predefined numbers accordingly.

16. The method according to claim 8, further comprising reporting the loop to an operator.

17. The method according to claim 8, further comprising issuing a cancel command to cancel the work unit.

18. The method according to claim 17, further comprising issuing a force command to force cancel the work unit in an event the cancel command is ineffective.

\* \* \* \* \*